US012400576B2

(12) United States Patent
Lee et al.

(10) Patent No.: US 12,400,576 B2
(45) Date of Patent: Aug. 26, 2025

(54) DISPLAY DEVICE AND METHOD OF DRIVING THE SAME

(71) Applicant: Samsung Display Co., LTD., Yongin-si (KR)

(72) Inventors: Ye Ji Lee, Yongin-si (KR); Yoon Kang, Yongin-si (KR); Jae Hyun Koh, Yongin-si (KR); Min Weun Kim, Yongin-si (KR); Jae Gwan Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/401,856

(22) Filed: Jan. 2, 2024

(65) Prior Publication Data

US 2024/0331610 A1 Oct. 3, 2024

(30) Foreign Application Priority Data

Mar. 27, 2023 (KR) ........................ 10-2023-0039737

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0819* (2013.01); *G09G 2300/0842* (2013.01); *G09G 2320/0233* (2013.01); *G09G 2320/041* (2013.01); *G09G 2320/0626* (2013.01)

(58) Field of Classification Search
CPC ... G09G 2300/0842; G09G 2300/0819; G09G 3/3233; G09G 2320/0233; G09G 2320/041; G09G 3/2096; G09G 2320/0626
See application file for complete search history.

(56) References Cited

U.S. PATENT DOCUMENTS

| | | | | |
|---|---|---|---|---|
| 9,153,164 | B2 | 10/2015 | Lee | |
| 10,096,300 | B2 | 10/2018 | Cheon et al. | |
| 2010/0220069 | A1* | 9/2010 | Choi | G01J 1/44 345/173 |
| 2018/0096650 | A1* | 4/2018 | Pyeon | G09G 3/3233 |
| 2020/0312235 | A1* | 10/2020 | Kim | G09G 3/3275 |
| 2023/0237949 | A1 | 7/2023 | Kim et al. | |

FOREIGN PATENT DOCUMENTS

KR 1020230124143 A 8/2023

* cited by examiner

*Primary Examiner* — Muhammad N Edun
(74) *Attorney, Agent, or Firm* — CANTOR COLBURN LLP

(57) ABSTRACT

A display device includes: a display unit including pixels connected to data lines and scan lines, the display unit being partitioned into a plurality of blocks; at least one driver overlapping with the display unit in a plan view, where the at least one driver is configured to drive the display unit; a temperature sensor for generating an ambient temperature value; and a timing controller for generating a panel temperature value corresponding to an actual temperature of the display unit by using the ambient temperature value, and generating pixel temperature values corresponding to temperatures of the pixels, respectively, by using the panel temperature value. The timing controller is supplied with input data, and generates output data by reflecting the pixel temperature value on the input data.

20 Claims, 13 Drawing Sheets

FIG. 6

LUT1

| AMBIENT TEMPERATURE VALUE | PANEL TEMPERATURE VALUE |
|---|---|
| 0~10°C | +15°C |
| 11~20°C | +10°C |
| 21~30°C | +8°C |
| 31~35°C | +6°C |
| 36~40°C | +4°C |
| 40~50°C | +2°C |

LUT2

| PANEL TEMPERATURE VALUE | BLOCK | | | | | | | |
|---|---|---|---|---|---|---|---|---|
| | L111 | ··· | L139 | L211 | ··· | L239 | G1 | G2 |
| 10°C | 12°C | ··· | 11°C | 9°C | ··· | 10°C | 8°C | 7°C |
| ⋮ | ⋮ | ··· | ⋮ | ⋮ | ··· | ⋮ | ⋮ | ⋮ |
| 15°C | 17°C | ··· | 18°C | 15°C | ··· | 16°C | 14°C | 14°C |
| ⋮ | ⋮ | ··· | ⋮ | ⋮ | ··· | ⋮ | ⋮ | ⋮ |
| 20°C | 22°C | ··· | 21°C | 25°C | ··· | 20°C | 20°C | 19°C |
| ⋮ | ⋮ | ··· | ⋮ | ⋮ | ··· | ⋮ | ⋮ | ⋮ |
| 25°C | 28°C | ··· | 27°C | 29°C | ··· | 26°C | 26°C | 24°C |
| ⋮ | ⋮ | ··· | ⋮ | ⋮ | ··· | ⋮ | ⋮ | ⋮ |
| 50°C | 52°C | ··· | 53°C | 48°C | ··· | 51°C | 47°C | 45°C |

DLUT: DLUT1~DLUT24

FIG. 9B

| Gray | offset |
|---|---|
| 255 | 0.98 |
| 254 | 0.99 |
| ⋮ | ⋮ |
| 128 | 1 |
| ⋮ | ⋮ |
| 2 | 1.06 |
| 1 | 1 |
| 0 | 1 |

DISPLAY DEVICE AND METHOD OF DRIVING THE SAME

This application claims priority to Korean patent application No. 10-2023-0039737 filed on Mar. 27, 2023, and all the benefits accruing therefrom under 35 U.S.C. § 119, the content of which in its entirety is herein incorporated by reference.

BACKGROUND

1. Technical Field

The present disclosure generally relates to a display device and a method of driving the same.

2. Related Art

A display device includes a timing controller, a data driver, a display unit, and the like, and the display unit includes pixels. The timing controller and the data driver may be located on a rear surface of the display unit. Also, an application processor and the like may be additionally located on the rear surface of the display unit.

The temperature of the display unit may increase corresponding to positions of the timing controller, the data driver, the application processor, and the like. That is, the temperature of the display unit may be differently set corresponding to the positions of the timing controller, the data driver, the application processor, and the like, and accordingly, a non-uniform image may be displayed.

SUMMARY

Embodiments provide a display device and a method of driving the same, in which a temperature for each position of a display unit is decided, and data is compensated corresponding to the temperature for each position, so that an image with a uniform luminance can be displayed.

Embodiments also provide a display device and a method of driving the same, in which although a temperature varies for each position of a display unit, an image with the same (or similar) luminance is displayed corresponding to the same data signal.

In accordance with an aspect of the present disclosure, there is provided a display device including: a display unit including pixels connected to data lines and scan lines, the display unit being partitioned into a plurality of blocks; at least one driver overlapping with the display unit on a plane (i.e., in a plan view), the at least one driver configured to drive the display unit; a temperature sensor configured to generate an ambient temperature value; and a timing controller configured to generate a panel temperature value corresponding to an actual temperature of the display unit by using the ambient temperature value, and generate pixel temperature values corresponding to temperatures of the pixels, respectively, by using the panel temperature value, wherein the timing controller is supplied with input data, and generates output data by reflecting the pixel temperature value on the input data.

The blocks may include: at least one local block including an area overlapping with the driver in a plan view, and the at least one local block includes a plurality of sub-blocks; and at least one global block including an area not overlapping with the driver in a plan view.

A total number of pixels included in the global block may be greater than a total number of pixels included in each of the sub-blocks.

The display device may further include a storage unit including a first lookup table in which the panel temperature value corresponding to the ambient temperature value is stored and a second lookup table in which a temperature value of each of the sub-blocks and the global block, which corresponds to the panel temperature value, is stored.

The timing controller may include a dimming unit configured to generate the output data by correcting the input data, corresponding to a dimming level input from the outside and the pixel temperature value.

The timing controller may include: a block temperature calculator configured to extract the panel temperature value corresponding to the ambient temperature value from the first lookup table, and extract block temperature values corresponding to temperatures of the sub-blocks and the global block, respectively, from the second lookup table, corresponding to the panel temperature value; and a pixel temperature calculator configured to generate the pixel temperature values by calculating temperatures of the pixels included in the sub-blocks and the global block, respectively, corresponding to the block temperature values.

The pixel temperature calculator may generate the pixel temperature values such that pixels located at a boundary portion of sub-blocks adjacent to each other among the sub-blocks have similar temperature values or the same temperature value.

The pixel temperature calculator may generate the pixel temperature values such that pixels located at a boundary portion of at least one of the sub-blocks and the global block have similar temperature values or the same temperature value.

The dimming unit may include a dimming lookup table including offset values corresponding to grayscales of the input data, corresponding to a specific dimming level and a specific pixel temperature value.

The dimming lookup table may be provided in plurality, and the plurality of dimming lookup tables may correspond to at least two different dimming levels and at least two different pixel temperature values among the pixel temperature values.

The dimming unit may further include a dimming controller configured to select any one of the plurality of dimming lookup tables, corresponding to the specific dimming level and the specific pixel temperature value, and generate the output data by reflecting the offset values extracted from the selected dimming lookup table on the input data.

When any dimming lookup table corresponding to a specific dimming level or the specific pixel temperature value is not included in the dimming unit, the dimming controller may generate a dimming lookup table corresponding to the specific dimming level or the specific pixel temperature value by using interpolation, and generate the output data by using an offset value extracted from the generated dimming lookup table.

The drivers may include: a scan driver configured to supply a scan signal to the scan lines; a data driver configured to supply a data signal to the data lines; the timing controller; and an application processor configured to supply a dimming level and the input data to the timing controller.

In accordance with another aspect of the present disclosure, there is provided a method of driving a display device, the method including: partitioning a display unit into a plurality of blocks, corresponding to positions of drivers overlapping with the display unit on a plane (i.e., in a plan view); generating an ambient temperature value by using a temperature sensor attached at a predetermined position of the display unit; generating a panel temperature value corresponding to an actual temperature at the predetermined position of the display unit by using the ambient temperature value; generating block temperature values corresponding to a temperature of the plurality of blocks, respectively, by using the panel temperature value; generating pixel temperature values corresponding to temperatures of pixels included in the plurality of blocks by using the block temperature values; and generating output data by correcting input data, corresponding to the pixel temperature values and a dimming level.

The blocks may include: at least one local block including an area overlapping with the driver in a plan view, the at least one local block including a plurality of sub-blocks; and at least one global block including an area not overlapping with the driver in a plan view.

A number of pixels included in the global block may be greater than a number of pixels included in each of the sub-blocks.

The generating of the panel temperature value may be extracting the panel temperature value from a first lookup table in which the panel temperature value corresponding to the ambient temperature value is stored. The generating of the block temperature value may be extracting the block temperature value from a second lookup table in which a temperature value of each of the blocks, which corresponds to the panel temperature value, is stored.

In the generating of the pixel temperature value, the pixel temperature values may be generated such that pixels located at a boundary portion of blocks adjacent to each other among the blocks have similar temperature values or the same temperature value.

The generating of the output data may include: selecting at least one dimming lookup table corresponding to the pixel temperature value and the dimming level among a plurality of dimming lookup tables corresponding to a plurality of dimming levels and a plurality of pixel temperature values; and generating the output data by applying an offset value included in the dimming lookup table to the input data.

The method may further include generating a virtual dimming lookup table by interpolating at least two dimming lookup tables, corresponding to the pixel temperature value and the dimming level.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 6 is a diagram illustrating an embodiment of a first lookup table shown in FIG. 5.

FIGS. 9A and 9B are diagrams illustrating an embodiment of a dimming lookup table shown in FIG. 8.

DETAILED DESCRIPTION

Figure 1:
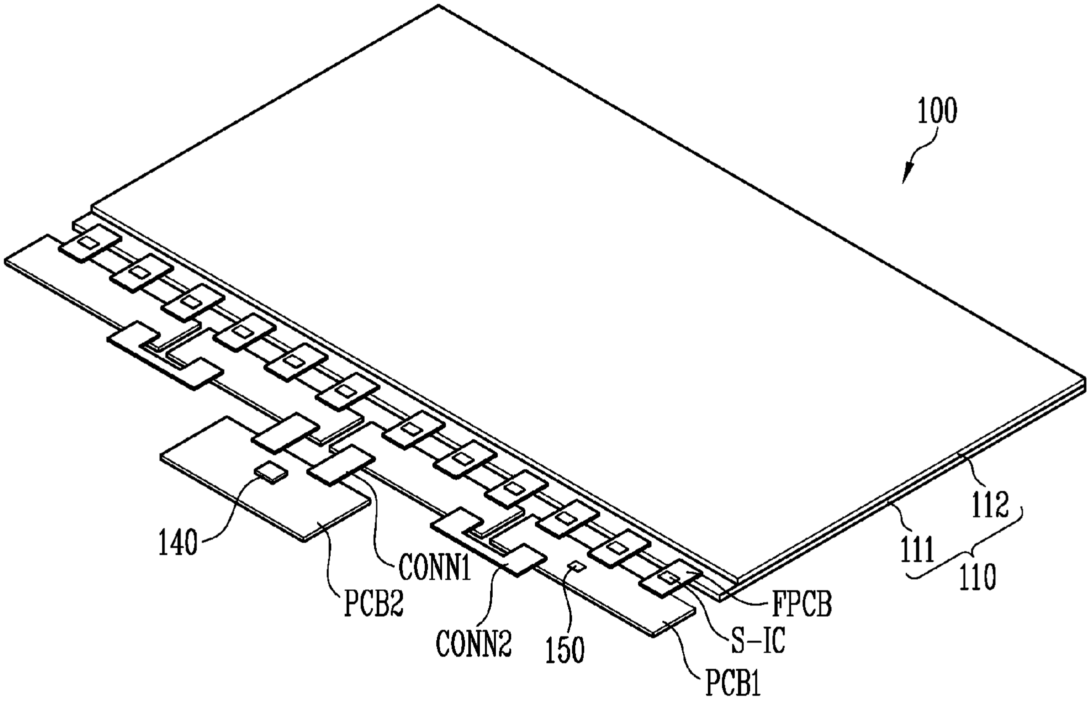
FIGS. 1 and 2 are diagrams illustrating a display device in accordance with an embodiment of the present disclosure.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

In description, the expression "equal" may mean "substantially equal." That is, this may mean equality to a degree to which those skilled in the art can understand the equality. Other expressions may be expressions in which "substantially" is omitted.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the present disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the present disclosure. Also, in some embodiments, the blocks, the units, and/or the modules may be physically separated into more complex blocks, more complex units, and/or more complex modules without departing from the scope of the present disclosure.

The term "connection" between two components may include both electrical connection and physical connection, but the present disclosure is not necessarily limited thereto. For example, the term "connection" used based on circuit diagrams may mean electrical connection, and the term "connection" used based on sectional and plan views may mean physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the present disclosure.

Meanwhile, the present disclosure is not limited to embodiments disclosed below, and may be implemented in various forms. Each embodiment disclosed below may be independently embodied or be combined with at least another embodiment prior to being embodied.

Figure 2:
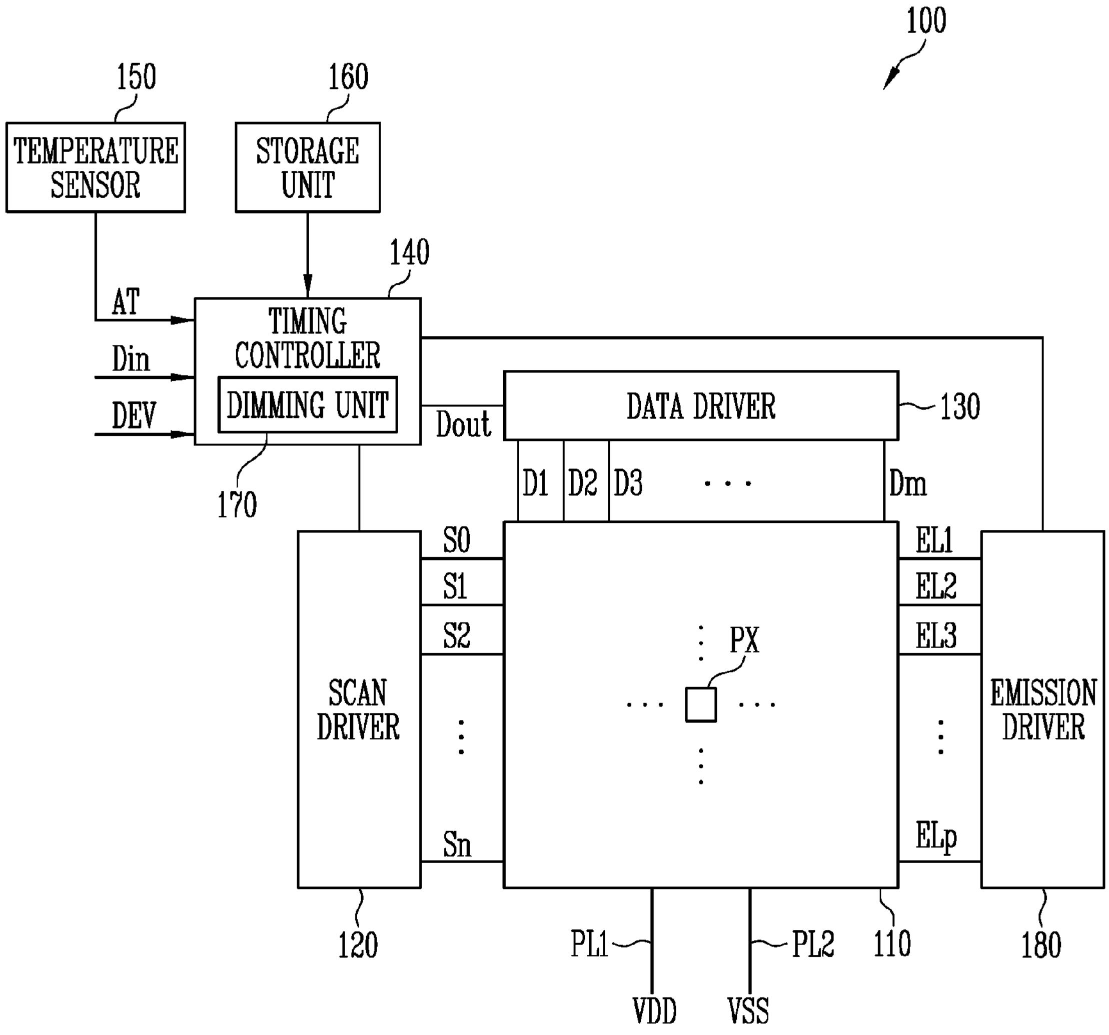

FIGS. 1 and 2 are diagrams illustrating a display device in accordance with an embodiment of the present disclosure. A perspective view of the display device 100 is illustrated in FIG. 1, and a block diagram of the display device 100 is illustrated in FIG. 2.

Referring to FIGS. 1 and 2, the display device 100 in accordance with the embodiment of the present disclosure may include a display unit 110 (or display panel), a scan driver 120, a data driver 130, a timing controller 140, a temperature sensor 150, a storage unit 160, and an emission driver 180. The scan driver 120, the data driver 130, the timing controller 140, the temperature sensor 150, the storage unit 160, and the emission driver 180 may constitute a driving device (or driver) which drives the display unit 110.

The display unit 110 may display an image. The display unit 110 may be an organic light emitting display panel, a liquid crystal display panel, an electrophoretic display device, or an inorganic light emitting display panel.

As shown in FIG. 1, the display unit 110 may include a lower substrate 111 and an upper substrate 112. The lower substrate 111 may be a thin film transistor substrate made of plastic or glass. The upper substrate 112 may be an encapsulation substrate configured with a plastic film, an organic substrate, or a protective film.

The display unit 110 may include scan lines S0 to Sn, data lines D1 to Dm, emission control lines EL1 to ELp, a first power line PL1, a second power line PL2, and pixels PX (each of n, m, and p is a natural number).

The pixels PX may be disposed in areas partitioned by the scan lines S0 to Sn, the data lines D1 to Dm, and emission control lines EL1 to ELp. Each of the pixels PX may be connected to at least one of the scan lines S0 to Sn, any one of the data lines D1 to Dm, and at least one of the emission control lines EL1 to ELp. For example, a pixel PXij (see FIG. 12) located on an ith row and a jth column may be connected to an ith scan line Si, an ith emission control line ELi, and a jth data line Dj (each of i and j is natural number).

Also, each of the pixels PX may be electrically connected between the first power line PL1 and the second power line PL2. A voltage of a first power source VDD may be applied to the first power line PL1, and a voltage of the second power source VSS may be applied to the second power line PL2. The first power source VDD and the second power source VSS may provide a power voltage or a driving voltage, which is necessary for operations of the pixels PX, and the first power source VDD may have a voltage level higher than a voltage level of the second power source VSS during a period in which the pixels PX emit light.

Each of the pixels PX may be supplied with a data signal from a data line connected thereto when a scan signal is supplied to a scan line connected thereto. The pixel PX supplied with the data signal may emit, to the outside, light with a luminance corresponding to the data signal. Each of the pixels PX may emit, to the outside, light of any one color among a first color, a second color, and a third color. The first color, the second color, and the third color may be different colors. In an example, the first color may be set to red, the second color may be set to green, and the third color may be set to blue. In another example, the first color may be set to magenta, the second color may be set to cyan, and the third color may be set to yellow.

Additionally, signal lines (e.g., a scan line, a data line, and an emission control line) connected to each of the pixels PX and a driving method of the pixel PX may be changed corresponding to a structure of the pixel PX. In an example, the emission control line may be removed corresponding to the structure of the pixel PX. In the embodiment of the present disclosure, the pixel PX may be selected as any one of various pixels currently known in the art.

The scan driver 120 may generate a scan signal, corresponding to a control signal from the timing controller 140, and supply the scan signal to the scan lines S0 to Sn. In an example, the timing controller 140 may supply, to the scan driver 120, a control signal including a scan start pulse, a clock signal, and the like. The scan driver 120 may be implemented as a shift register which sequentially generates and outputs a scan signal in a pulse form by sequentially shifting the scan start pulse in a pulse form, using the clock signal.

The scan driver 120 may be formed together with the pixels PX on the display unit 110. However, the present disclosure is not limited thereto. For example, the scan driver 120 may be mounted on a circuit film, and be connected to the timing controller 140 via at least one circuit film and a printed circuit board.

The emission driver 180 may generate an emission control signal, corresponding to a control signal from the timing controller, and supply the emission control signal to the emission control lines EL1 to ELp.

In an example, the timing controller 140 may supply, to the emission driver 180, a control signal including an emission start pulse, a clock signal, and the like. The emission driver 180 may be implemented as a shift register which sequentially generates and outputs an emission control signal in a pulse form by sequentially shifting the emission start pulse in a pulse form, using the clock signal.

The emission driver 180 may be formed together with the pixels PX on the display unit 110. However, the present disclosure is not limited thereto. For example, the emission driver 180 may be mounted on a circuit film, and be connected to the timing controller 140 via at least one circuit film and a printed circuit board.

The data driver 130 may be supplied with output data Dout and control signals from the timing controller 140. The data driver 130 supplied with the control signals may generate a data signal (or data voltage) in an analog from by using the output data in a digital form, and supply the data signal to the data lines D1 to Dm. The data driver 130 may supply the data signal in units of pixel rows (or horizontal lines). The pixel row may mean a row on which pixels connected to the same scan line are disposed.

The temperature sensor 150 may sense an ambient temperature, and supply an ambient temperature value AT corresponding to the ambient temperature to the timing controller 140. The temperature sensor 150 may be mounted on a first printed circuit board PCB1. The temperature 150 may measure an ambient temperature of a position at which the temperature sensor 150 is attached to the first printed circuit board PCB1, and supply an ambient temperature value AT corresponding to the ambient temperature to the timing controller 140. In an example, the temperature sensor 150 may supply, to the timing controller 140, a temperature at a right lower end of the display unit 110 as the ambient temperature value AT. In the embodiment of the present disclosure, the mounting position of the temperature sensor 150 is not limited to the above-described position, and the temperature sensor 150 may be disposed at various positions as long as the temperature sensor 150 can measure an ambient temperature.

Figure 5:
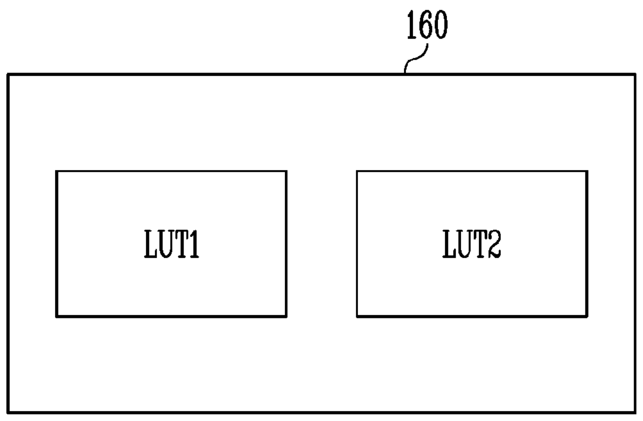
FIG. 5 is a diagram illustrating an embodiment of a storage unit shown in FIG. 2.

The storage unit 160 may include a first lookup table LUT1 and a second lookup table LUT2 as shown in FIG. 5. A panel temperature value corresponding to the ambient temperature value AT may be stored in the first lookup table LUT1. A temperature value for each block of the display unit 110, which corresponds to the panel temperature value, may be stored in the second lookup table LUT2. This will be described in detail later with reference to FIGS. 5, 6A, and 6B. In FIG. 2, it is illustrated that the storage unit 160 is located at the outside of the timing controller 140. However, the embodiment of the present disclosure is not limited thereto. In an example, the storage unit 160 may be located at the inside of the timing controller 140.

The timing controller 140 may receive input data Din and a timing control signal, which are transmitted from an application processor AP (see FIG. 3), and generate control signals to be supplied to the scan driver 120, the data driver 130, and the emission driver 140, based on the timing control signal.

Also, the timing controller 140 may generate output data Dout by converting the input data Din. In an example, the timing controller 140 may output the output data Dout by correcting the input data Din, corresponding to a dimming signal DEV transmitted from the application processor AP and the ambient temperature value AT transmitted from the temperature sensor 150.

The timing controller 140 may be supplied with the dimming signal DEV from the application processor AP. The dimming signal DEV may include a dimming level indicating a maximum display luminance with which the display device 100 can emit light. For example, as the dimming level increases, the maximum display luminance with which the display unit 110 can emit light may increase. The maximum display luminance may be a luminance measured when the whole of the display unit 110 emit light with a maximum luminance in the display device 100.

The timing controller 140 may include a dimming unit 170. The dimming unit 170 may generate the output data Dout by correcting the input data Din, corresponding to the dimming level included in the dimming signal DEV. Meanwhile, in FIG. 2, it is illustrated that the dimming unit 170 is located in the timing controller 140. However, the embodiment of the present disclosure is not limited thereto. In an example, all or some components of the dimming unit 170 may be located at the outside of the timing controller 140.

As shown in FIG. 1, the data driver 130 may include a plurality of data integrated circuits IC (or source integrated circuits S-IC). The data integrated circuit S-IC may be mounted on a flexible circuit board FPCB, and be connected to the timing controller 140 via at least one printed circuit board PCB1 and PCB2 and/or at least one cable CONN1 and CONN2.

In an embodiment, the data integrated circuit S-IC may be mounted on the flexible circuit board FPCB, and one side of the flexible circuit board FPCB may be electrically connected to pads (not shown) located in the display unit 110. The pads may be electrically connected to the data lines D1 to Dm, and accordingly, the data integrated circuit S-IC may be electrically connected to the data lines D1 to Dm.

The timing controller 140 may be mounted on a second printed circuit board PCB2. The second printed circuit board PCB2 may be electrically connected to first printed circuit boards PCB1 via first cables CONN1. In addition, the first printed circuit boards PCB1 may be electrically connected to each other via second cables CONN2. The timing controller 140 may be electrically connected to the data integrated circuit S-IC via the first printed circuit board PCB1, the first cables CONN1, and the second cables CONN2.

Meanwhile, in FIG. 1, it is illustrated that only the timing controller 140 is mounted on the second printed circuit board PCB2. However, the embodiment of the present disclosure is not limited thereto. In an example, various components including a sensing unit, a power unit, and the like may be additionally mounted on the second printed circuit board PCB2. In addition, the application processor AP may be additionally mounted on the second printed circuit board PCB2. In an example, the application processor AP may be mounted on the second printed circuit board PCB2 in a complete product manufacturer (or set manufacturer), or be mounted on a separate circuit board electrically connected to the second printed circuit board PCB2.

Figure 3:
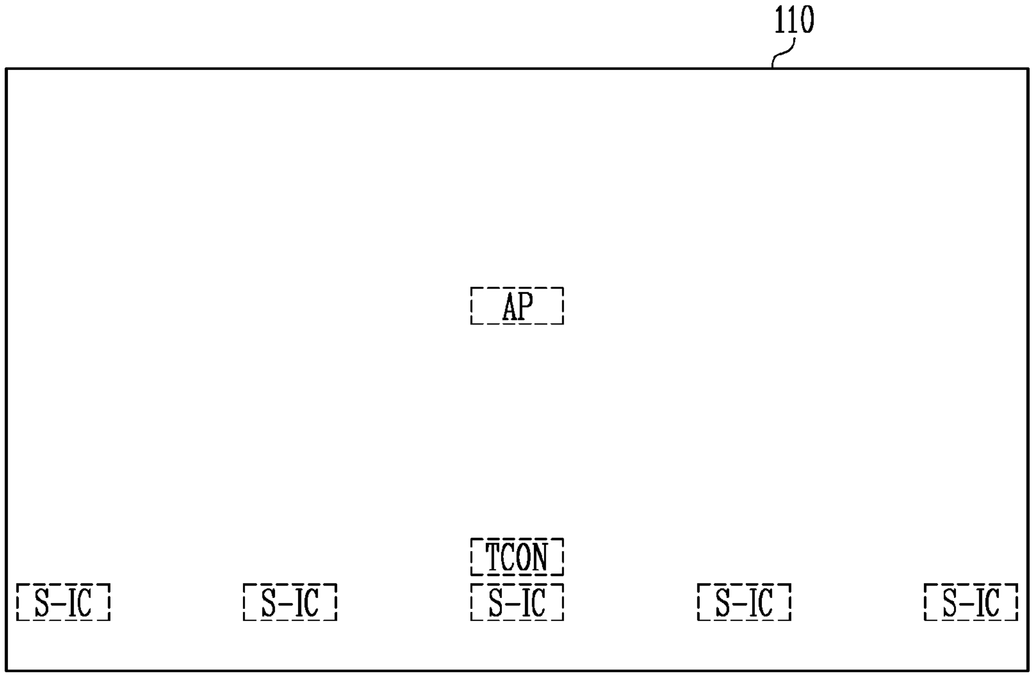
FIG. 3 is a diagram illustrating an embodiment of driving devices located to overlap with a display unit.

FIG. 3 is a diagram illustrating an embodiment of driving devices (drivers) located to overlap with the display unit.

Referring to FIG. 3, the flexible circuit board FPCB may be disposed in a shape bent to face a rear surface of the display unit 110, and accordingly, the first printed circuit board PCB1 and the second printed circuit board PCB2 may be attached (or fixed) to the rear surface of the display unit 110. The first printed circuit board PCB1 and the second printed circuit board PCB2 may not be viewed from the outside (not viewed from the top).

When the first printed circuit board PCB1 and the second printed circuit board PCB2 are attached to the rear surface of the display unit 110, the display unit 110 may overlap with the application processor AP, the data integrated circuit S-IC, and the timing controller 140 or TCON on a plane (i.e., in a plan view).

When the application processor AP, the data integrated circuit S-IC, and the timing controller 140 overlap with the display unit 110 in a plan view, the temperature of the display unit 110 may vary corresponding to positions of the application processor AP, the data integrated circuit S-IC, and the timing controller 140. In an example, a predetermined heat may be generated in each of the application processor AP, the data integrated circuit S-IC, and/or the timing controller 140 in driving of the display device 100, and the temperature of the display unit 110 adjacent to the application processor AP, the data integrated circuit S-IC, and the timing controller 140 may increase corresponding to the predetermined heat.

That is, the temperature of the display unit 110 may be non-uniformly set in the driving of the display device 100. Therefore, when the temperature of the display unit 110 is non-uniformly set, an image with a non-uniform luminance may be displayed corresponding to the temperature of the display unit 110, even when the same data signal is supplied. In the embodiment of the present disclosure, there is proposed a method of deciding a temperature for each position of the display unit 110 and compensating for data, corresponding to the temperature.

Figure 4A:
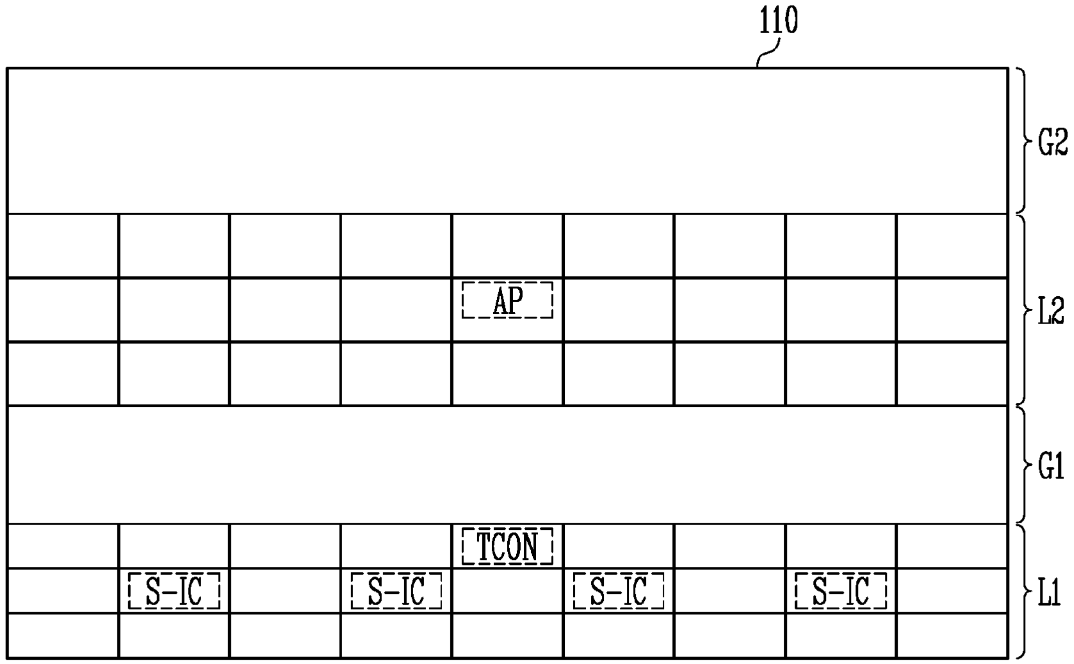
FIGS. 4A and 4B are diagrams illustrating an embodiment of blocks partitioned in the display unit.
Figure 4B:
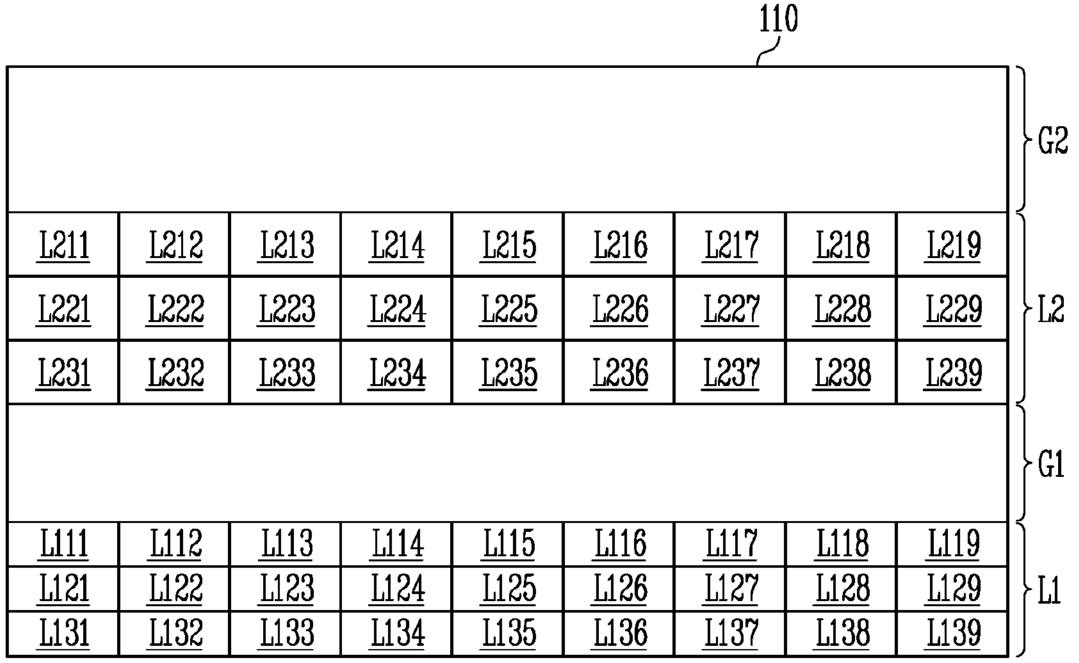

FIGS. 4A and 4B are diagrams illustrating an embodiment of blocks partitioned in the display unit.

Referring to FIGS. 4A and 4B, the display unit 110 may be divided (or partitioned) into a plurality of blocks L1, G1, L2, and G2. That is, the display unit 110 may have the plurality of blocks L1, G1, L2, and G2. The blocks L1, G1, L2, and G2 may include at least one local block L1 and L2 and at least one global block G1 and G2.

The local block L1 and L2 may mean a block overlapping with any one of the application processor AP, the data integrated circuit S-IC, and/or the timing controller 140 on a plane (i.e., in a plan view).

A first local block L1 may overlap with at least one of the data integrated circuit S-IC and the timing controller 140 in a plan view. Since the first local block L1 overlaps with at least one of the data integrated circuit S-IC and the timing controller 140 in a plan view, a temperature may be non-uniformly set corresponding to a position. The first local block L1 may be divided (or partitioned) into a plurality of first sub-blocks L111, L112, . . . , and L139 such that the non-uniform temperature can be compensated. That is, the first local block L1 may have the plurality of first sub-blocks L111 to L139. Some (e.g., L115, L122, L124, L126, and L128) of the first sub-blocks L111 to L139 may overlap with any one of the data integrated circuit S-IC and the timing controller 140 in a plan view, and the others (e.g., L111 to L114, L116 to L119, L121, L123, L125, L127, L129, and L131 to L139) of the first sub-blocks L111 to L139 may not overlap with the data integrated circuit S-IC and the timing controller 140 in a plan view.

The other blocks L111 to L114, L116 to L119, L121, L123, L125, L127, L129, and L131 to L139 included in the first local block L1 may be located adjacent to the some blocks L115, L122, L124, L126, and L128. Accordingly, the first local block L1 may have a non-uniform temperature distribution.

The first sub-blocks L111 to L139 may include the same number of pixels and/or include different numbers of pixels. In an embodiment of the present disclosure, the timing controller 140 may decide a temperature of each of the first sub-blocks L111 to L139, and compensate for input data Din such that a uniform image can be displayed corresponding to the temperature.

A second local block L2 may overlap with the application processor A1 in a plan view. Since the second local block L2 overlaps with the application processor A1 in a plan view, a temperature may be non-uniformly set corresponding to a position. The second local block L2 may be divided (or partitioned) into a plurality of second sub-blocks L211, L212, . . . , and L239 such that the non-uniform temperature can be compensated. That is, the second local block L2 may have the plurality of second sub-blocks L211 to L239. Some (e.g., L255) of the second sub-blocks L211 to L239 may overlap with the application processor AP in a plan view, and the others (e.g., L211 to L224 and L226 to L239) of the second sub-blocks L211 to L239 may not overlap with the application processor AP in a plan view.

The other blocks L211 to L224 and L226 to L239 included in the second local block L2 may be adjacent to the some blocks L255. Accordingly, the second local block L2 may have a non-uniform temperature distribution.

The second sub-blocks L211 to L239 may include the same number of pixels and/or include different numbers of pixels. In an embodiment of the present disclosure, the timing controller 140 may decide a temperature of each of the second sub-blocks L211 to L239, and compensate for input data Din such that a uniform image can be displayed corresponding to the temperature.

The global block G1 and G2 may mean a block not overlapping with the application processor AP, the data integrated circuit S-IC, and the timing controller 140 in a plan view. The global block G1 and G2 may entirely maintain a uniform temperature.

A first global block G1 may be located between the first local block L1 and the second local block L2. The first global block G1 may include pixels of which number is greater than the number of each of the first sub-blocks L111 to L139 and the second sub-blocks L211 to L239. In an embodiment of the present disclosure, the timing controller 140 may decide a temperature of the first global block G1, and compensate for input data Din such that a uniform image can be displayed corresponding to the temperature.

A second global block G2 may be located at an upper side of the second local block L2. The second global block G2 may include pixels of which number is greater than the number of each of the first sub-blocks L111 to L139 and the second sub-blocks L211 to L239. In an embodiment of the present disclosure, the timing controller 140 may decide a temperature of the second global block G2, and compensate for input data Din such that a uniform image can be displayed corresponding to the temperature.

Meanwhile, in FIGS. 4A and 4B, it is illustrated that the display unit 110 includes the first local block L1, the second local block L2, the first global block G1, and the second global block G2. However, the embodiment of the present disclosure is not limited thereto. In an example, the positions of the local block L1 and L2 and the global block G1 and G2 may be variously changed corresponding to positions of the application processor AP, the data integrated circuit S-IC, and/or the timing controller 140, which overlap with the display unit 110 in a plan view.

The local block L1 and L2 is an area overlapping with the application processor AP, the data integrated circuit S-IC, and/or the timing controller 140 in a plan view, and may include sub-blocks L111 to L139 and L211 to L239 for the purpose of stable temperature compensation. The global block G1 and G2 is an area not overlapping with the application processor AP, the data integrated circuit S-IC, and the timing controller 140 in a plan view, and may not include any separate sub-blocks.

Figures 7, 8:
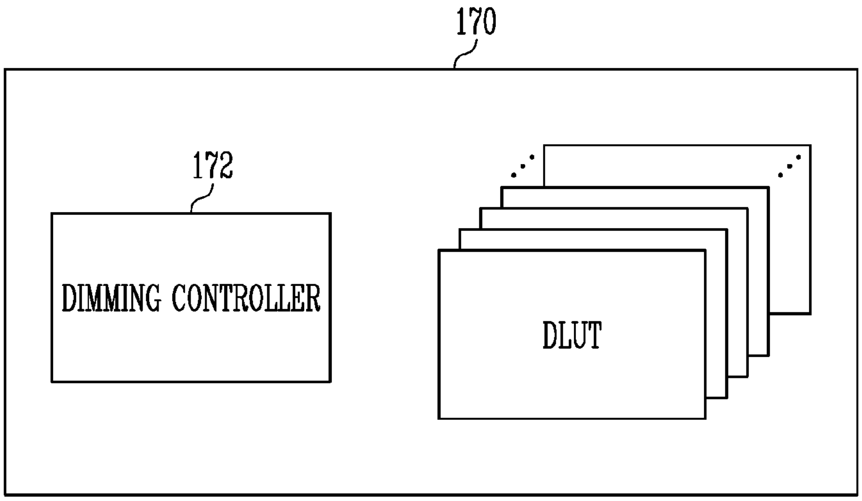
FIG. 7 is a diagram illustrating an embodiment of a second lookup table shown in FIG. 5.
FIG. 8 is a diagram illustrating an embodiment of a dimming unit shown in FIG. 2.

FIG. 5 is a diagram illustrating an embodiment of the storage unit shown in FIG. 2. FIG. 6 is a diagram illustrating an embodiment of a first lookup table shown in FIG. 5. FIG. 7 is a diagram illustrating an embodiment of a second lookup table shown in FIG. 5.

Referring to FIGS. 5 to 7, the storage unit 160 may include a first lookup table LUT1 and a second lookup table LUT2.

A panel temperature value (or a temperature of the display unit 110) corresponding to an ambient temperature value AT may be stored in the first lookup table LUT1. An ambient temperature value AT measured by the temperature sensor 150 may be different from an actual temperature of the display unit 110. In an example, the ambient temperature value AT measured by the temperature sensor 150 is a temperature of one side of the first printed circuit board PCB1, and may be different from a temperature value of a specific position of the display unit 110 overlapping with the temperature sensor 150 in a plan view.

A temperature value (e.g., a panel temperature value) of the specific position of the display unit 110, which corresponds to the ambient temperature value AT, may be stored in the first lookup table LUT1. In an example, a panel temperature value of the first lookup table LUT1 may be pre-stored by measuring the panel temperature value corresponding to the ambient temperature value AT.

In an example, when the ambient temperature value AT is set to 0° C. to 10° C., the panel temperature value may be set to a value obtained by adding +15° C. to the ambient temperature value AT. In other words, when the ambient temperature value AT is set to 10° C., the panel temperature value may be set to 25° C. According to the first lookup table LUT1, the panel temperature value may be set to a value obtained by adding +10° C. to the ambient temperature value AT when the ambient temperature value AT is 11° C. to 20° C., the panel temperature value may be set to a value obtained by adding +8° C. to the ambient temperature value AT when the ambient temperature value AT is 21° C. to 30° C., the panel temperature value may be set to a value obtained by adding +6° C. to the ambient temperature value AT when the ambient temperature value AT is 31° C. to 35° C., the panel temperature value may be set to a value obtained by adding +4° C. to the ambient temperature value AT when the ambient temperature value AT is 36° C. to 40° C., and the panel temperature value may be set to a value obtained by adding +2° C. to the ambient temperature value AT when the ambient temperature value AT is 40° C. to 50° C.

The panel temperature value of the first lookup table LUT1 shown in FIG. 6 is merely illustrative, and an actual panel temperature value may be pre-measured corresponding to a kind of panel to be stored in the first lookup table LUT1.

A temperature value of each of the blocks L1, L2, G1, and G2, which corresponds to a panel temperature value, may be stored in the second lookup table LUT2. The panel temperature value stored in the first lookup table LUT1 corresponds to a specific position of the display unit 110, and does not include any total temperature of the display unit 110. A temperature value of each of the blocks L1, L2, G1, and G2, which corresponds to the panel temperature value, may be pre-stored in the second lookup table LUT2. In an embodiment, a temperature of each of the first sub-blocks L111 to L139 included in the first local block L1, which corresponds to the panel temperature value, a temperature of each of the second sub-blocks L211 to L239 included in the second local block L2, which corresponds to the panel temperature value, a temperature of the first global block G1, which corresponds to the panel temperature value, and a temperature of the second global block G2, which corresponds to the panel temperature value, may be pre-stored in the second lookup table.

In an example, when the panel temperature value is 10° C., the temperature of a first first sub-block L111 ("block temperature value BT") may be set to 12° C., and the temperature of a last first sub-block L139 may be set to 11° C. Also, when the panel temperature value is 10° C., the temperature of a first second sub-block L211 may be set to 9° C., and the temperature of a last second sub-block L239 may be set to 10° C. Also, when the panel temperature value is 10° C., the temperature of a first global block G1 may be set to 8° C., and the temperature of a second global block G2 may be set to 7° C.

In an example, when the panel temperature value is 15° C., the temperature of the first first sub-block L111 may be set to 17° C., the temperature of the last first sub-block L139 may be set to 18° C., the temperature of the first second sub-block L211 may be set to 15° C., the temperature of the last second sub-block L239 may be set to 16° C., the temperature of the first global block G1 may be set to 14° C., and the temperature of the second global block G2 may be set to 14° C.

In an example, when the panel temperature value is 20° C., the temperature of the first first sub-block L111 may be set to 22° C., the temperature of the last first sub-block L139 may be set to 21° C., the temperature of the first second sub-block L211 may be set to 25° C., the temperature of the last second sub-block L239 may be set to 20° C., the temperature of the first global block G1 may be set to 20° C., and the temperature of the second global block G2 may be set to 19° C.

In an example, when the panel temperature value is 25° C., the temperature of the first first sub-block L111 may be set to 28° C., the temperature of the last first sub-block L139 may be set to 27° C., the temperature of the first second sub-block L211 may be set to 29° C., the temperature of the last second sub-block L239 may be set to 26° C., the temperature of the first global block G1 may be set to 26° C., and the temperature of the second global block G2 may be set to 24° C.

In an example, when the panel temperature value is 50° C., the temperature of the first first sub-block L111 may be set to 52° C., the temperature of the last first sub-block L139 may be set to 53° C., the temperature of the first second sub-block L211 may be set to 48° C., the temperature of the last second sub-block L239 may be set to 51° C., the temperature of the first global block G1 may be set to 47° C., and the temperature of the second global block G2 may be set to 45° C.

The second lookup table LUT2 shown in FIG. 7 exemplarily represents temperatures of the blocks L1, L2, G1, and G2, which are correspond to the panel temperature value. In an embodiment, temperatures of the blocks L1, L2, G1, and G2 may be actually measured corresponding to a plurality of panel temperature values in a processing process, and the second lookup table LUT2 may be generated using the actually measured temperatures.

Figure 9A:
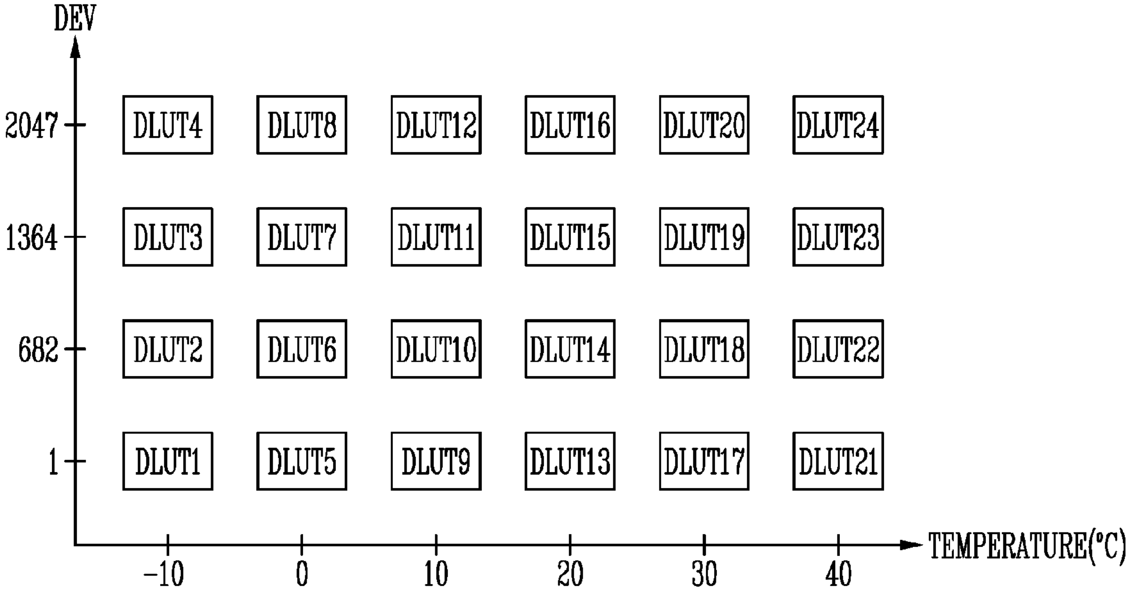

FIG. 8 is a diagram illustrating an embodiment of the dimming unit shown in FIG. 2. FIGS. 9A and 9B are diagrams illustrating an embodiment of a dimming lookup table shown in FIG. 8. FIG. 9A may illustrate an embodiment of a dimming lookup table corresponding to 2047 dimming levels. FIG. 9B may illustrate offset values corresponding to 255 grayscales Gray.

Referring to FIG. 8, the dimming unit 170 in accordance with the embodiment of the present disclosure may include a dimming controller 172 and a plurality of dimming lookup table DLUT.

Figure 10:
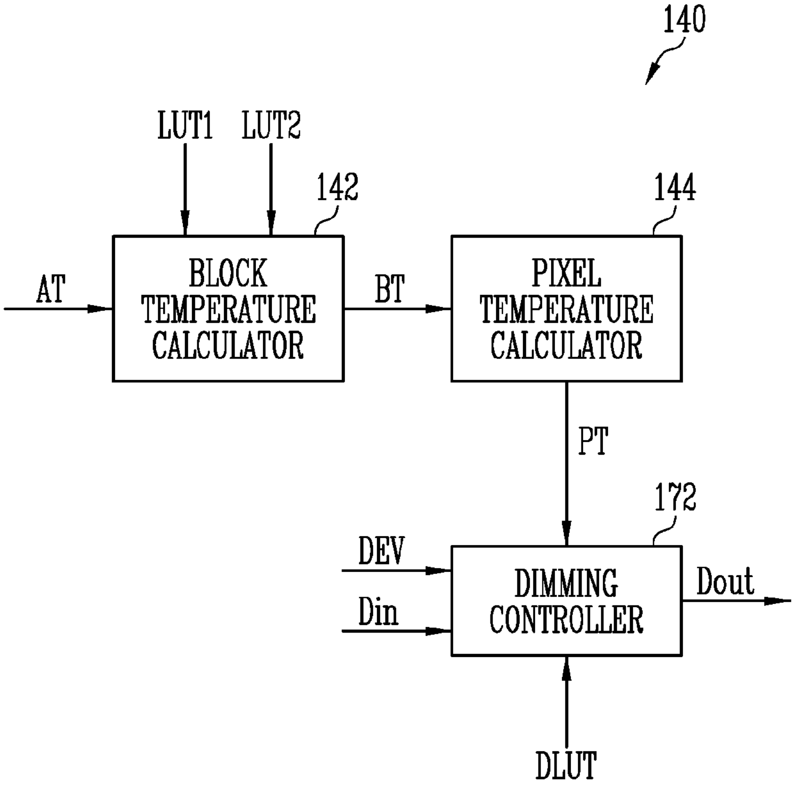
FIG. 10 is a diagram illustrating a timing controller in accordance with an embodiment of the present disclosure.

As shown in FIG. 10, the dimming controller 172 may be supplied with a dimming signal DEV and the input data Din, and generate output data Dout by correcting the input data Din. The dimming controller 172 will be described in detail later with reference to FIG. 10.

Each of the dimming lookup tables DLUT may have an offset value corresponding to a grayscale Gray of the input data Din, corresponding to a specific temperature and a specific dimming level.

Referring to FIG. 9A, the dimming unit 170 may include a plurality of dimming lookup tables DLUT1 to DLUT24, corresponding to a plurality of temperatures (e.g., −10° C., 0° C., 10° C., 20° C., 30° C., and 40° C.) and a plurality of dimming levels (e.g., level 1, level 682, level 1364, and level 2047). In an embodiment, the dimming unit 170 may include 24 dimming lookup tables DLUT1 to DLUT24, corresponding to 6 different temperatures and 4 different dimming levels.

In an example, the dimming unit 170 may include a first dimming lookup table DLUT1 corresponding to −10° C. and a first dimming level, a second dimming lookup table DLUT2 corresponding to −10° C. and a 682nd dimming level, a third dimming lookup table DLUT3 corresponding to −10° C. and a 1364th dimming level, and a fourth dimming lookup table DLUT4 corresponding to −10° C. and a 2047th dimming level.

In an embodiment, the dimming unit 170 may include fifth to eighth dimming lookup tables DLUT5 to DLUT8 corresponding to 0° C. and 4 different dimming levels, ninth to twelfth dimming lookup tables DLUT9 to DLUT12 corresponding to 10° C. and 4 different dimming levels, thirteenth to sixteenth dimming lookup tables DLUT13 to DLUT16 corresponding to 20° C. and 4 different dimming levels, seventeenth to twentieth dimming lookup tables DLUT17 to DLUT20 corresponding to 30° C. and 4 different dimming levels, and twenty-first to twenty-fourth dimming lookup tables DLUT21 to DLUT24 corresponding to 40° C. and 4 different dimming levels.

Referring to FIG. 9B, each of the dimming lookup tables DLUT may have an offset value corresponding to the grayscale Gray of the input data Din. The dimming controller 172 may apply the offset value to input data Din to be supplied to a specific pixel, thereby generating output data Dout to be supplied to the specific pixel. In an example, when the input data Din to be supplied to the specific pixel has grayscale 255, the dimming controller 172 may apply (e.g., multiply) an offset value of 0.98 to the input data Din, thereby generating output data Dout.

Figure 11A:
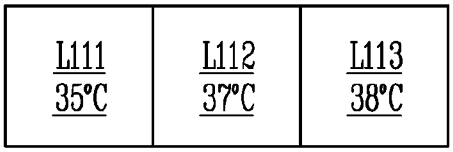
FIGS. 11A and 11B are diagrams illustrating an embodiment of an operation process of the timing controller shown in FIG. 10.
Figure 11B:
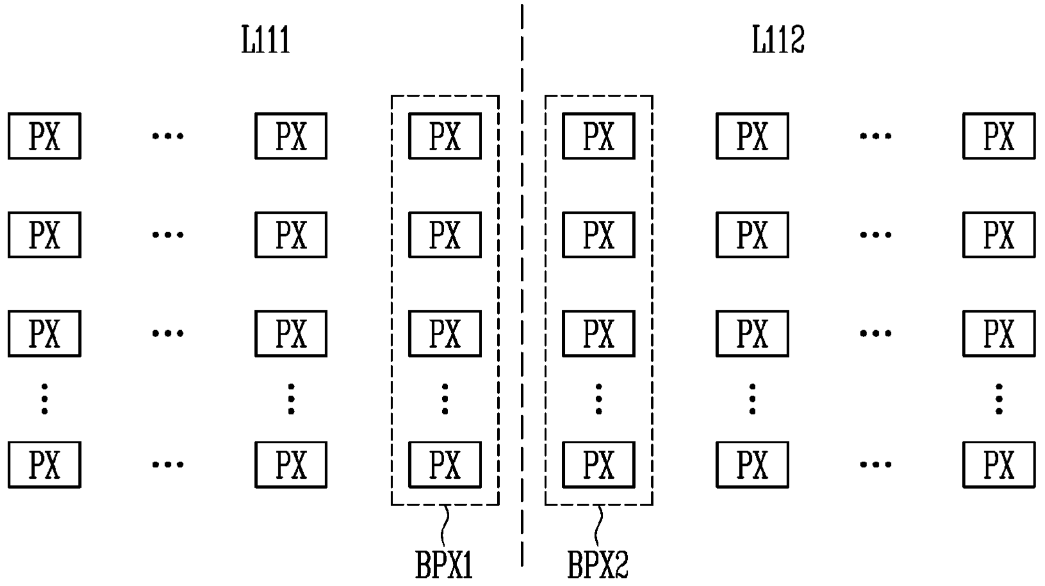

FIG. 10 is a diagram illustrating a timing controller in accordance with an embodiment of the present disclosure. In FIG. 10, only components necessary for description of the present disclosure among various components included in the timing controller 140 will be described. FIGS. 11A and 11B are diagrams illustrating an embodiment of an operation process of the timing controller shown in FIG. 10.

Referring to FIG. 10, the timing controller 140 may include a block temperature calculator 142 and a pixel temperature calculator 144. In an embodiment, each of the block temperature calculator 142 and the pixel temperature calculator 144 may be implemented as hardware or software. In an embodiment, some functions of the block temperature calculator 142 and the pixel temperature calculator 144 may be implemented as hardware, and the other functions of the block temperature calculator 142 and the pixel temperature calculator 144 may be implemented as software.

The block temperature calculator 142 may decide a temperature of each of the first sub-blocks L111 to L139 included in the first local block L1, a temperature of each of the second sub-blocks L211 to L239 included in the second local block L2, a temperature of the first global block G1, and a temperature of the second global block G2 by using an ambient temperature value AT. The temperature of each of the blocks L1, L2, G1, and G2, which is decided by the block temperature calculator 142, will be referred to as a block temperature value BT.

The pixel temperature calculator 144 may decide (or calculate) a temperature (e.g., a pixel temperature value PT) of each pixel included in each of the blocks L1, L2, G1, and G2 by using the block temperature value BT. The pixel temperature calculator 144 may calculate pixel temperature values PT such that pixels located at a boundary portion of the first sub-blocks L111 to L139, the second sub-blocks L211 to L239, the first global block G1, and the second global block G2 have similar temperatures (or the same temperature). When the pixels located at the boundary portion of the blocks L1, L2, G1, and G2 have similar temperatures, the boundary portion of the blocks L1, L2, G1, and G2 can be prevented from being recognized through temperature and dimming correction.

The dimming controller 172 may receive a dimming signal DEV, input data Din, and pixel temperature values PT. The dimming controller 172 may extract an offset value from at least one of the plurality of dimming lookup tables DLUT by using a dimming level included in the dimming signal DEV and a pixel temperature PT. After that, the dimming controller 172 may generate output data Dout by applying the offset value to the input data Din.

Meanwhile, as shown in FIG. 9A, the dimming lookup tables DLUT may correspond to a plurality of pixel temperature values PT and a plurality of dimming levels. When any dimming lookup table corresponding to a pixel temperature value PT is not included in the dimming unit 170 or when any dimming lookup table corresponding to a dimming level is not included in the dimming unit 170, the dimming controller 172 may generate a virtual dimming lookup table by using interpolation, and extract an offset value from the virtual dimming lookup table.

In an example, when the pixel temperature value PT is set to 5° C. and the dimming level has level 1, the dimming controller 172 may generate a virtual dimming lookup table by using the first dimming lookup table DLUT1 and the fifth dimming lookup table DLUT5. In an example, when the pixel temperature value PT is set to 5° C. and the dimming level has level 50, the dimming controller 172 may generate a virtual dimming lookup table by using the first dimming lookup table DLUT1, the fifth dimming lookup table DLUT5, the second dimming lookup table DLUT2, and the sixth dimming lookup table DLUT6. Any one method among methods currently known in the art may be used as the method of generating the virtual dimming lookup table by using the interpolation.

The operation process will be described in detail with reference to FIGS. 3 to 11B. The block temperature calculator 142 may receive an ambient temperature value AT input from the temperature sensor 150. The block temperature calculator 142 receiving the ambient temperature value AT may extract a panel temperature value by using the first lookup table LUT1. After that, the block temperature calculator 142 may extract a temperature of each of blocks L1 (L111 to L139), L2 (L211 to L239), G1, and G2 corresponding to the panel temperature value by using the second lookup table LUT2, and supply, to the pixel temperature calculator 144, the extracted temperature of each of the blocks L1 (L111 to L139), L2 (L211 to L239), G1, and G2 as a block temperature value BT.

In an example, as shown in FIG. 11A, a temperature of the first first sub-block L111, which is included in the block temperature value BT, may be set to 35° C., a temperature of a second first sub-block L112, which is included in the block temperature value BT, may be set to 37° C., and a temperature of a third first sub-block L113, which is included in the block temperature value BT, may be set to 38° C.

The pixel temperature calculator 144 may be supplied with a block temperature value BT, and calculate temperatures of pixels included in each of the blocks L1 (L111 to L139), L2 (L211 to L239), G1, and G2, corresponding to the block temperature value BT. As shown in FIG. 11B, the pixel temperature calculator 144 may generate a pixel temperature value PT such that pixels (e.g., BPX1 and BPX2) located at a boundary portion of sub-blocks located adjacent to each other have similar temperature values or the same temperature value.

In an example, the pixel temperature calculator 144 may generate a pixel temperature value PT such that pixels (e.g., BPX1 and BPX2) located at a boundary portion of sub-blocks located adjacent to each other among the sub-blocks L111 to L139 and L211 to L239 have similar temperature values or the same temperature value. In an example, the pixel temperature calculator 144 may generate a pixel temperature value PT such that pixels located at a boundary portion of at least one of the sub-blocks L111 to L139 and L211 to L239 and the global block G1 and G2 have similar temperature values or the same temperature value.

In an embodiment, the pixel temperature calculator 144 may calculate temperatures of pixels included in each of the blocks L1 (L111 to L139), L2 (L211 to L239), G1, and G2 by using the interpolation. The temperature of each of the pixels, which is calculated by the pixel temperature calculator 144, may be supplied as a pixel temperature value PT to the dimming controller 172.

The dimming controller 172 may receive a dimming signal DEV, input data Din, and pixel temperature values PT. In an embodiment, the dimming controller 172 may select at least one dimming lookup table among the dimming lookup tables DLUT1 to DLUT24, corresponding to a dimming level included in the dimming signal DEV and a pixel temperature value PT. In an example, the dimming controller 172 may generate a virtual dimming lookup table, corresponding to the dimming level included in the dimming signal DEV and the pixel temperature value PT.

The dimming controller 172 may extract an offset value from a dimming lookup table (or virtual dimming lookup table) corresponding to a dimming level and a pixel temperature value PT of a specific pixel, and apply the offset value to input data Din to be supplied to the specific pixel, thereby generating output data Dout.

The output data Dout generated by the dimming controller 172 may be supplied to the data driver 130, and the data driver 130 may generate a data signal by using the output data Dout and supply the data signal to the pixels PX.

In the above-described embodiment of the present disclosure, the timing controller 140 decides a temperature of each of the pixels PX by using an ambient temperature value AT supplied from the temperature sensor 150, and corrects input data Din, corresponding to the temperature of each of the pixels PX, thereby generating output data Dout. That is, in the embodiment of the present disclosure, the output data Dout is generated by reflecting the temperature of each of the pixels PX, and accordingly, an image with a uniform luminance can be displayed in the display unit 110.

Also, in the embodiment of the present disclosure, pixels BPX1, BPX2, . . . located at a boundary portion of each of the blocks L1, L2, G1, and G2 are set to have similar pixel temperature values PT (or the same pixel temperature value PT), and accordingly, boundary portions of the blocks L1 (111 to L139), L2 (L211 to L239), G1, and G2 can be prevented from be recognized by a user.

Additionally, in FIG. 10, it has been described that the timing controller 140 generates output data Dout by reflecting a dimming level and temperature information. However, the embodiment of the present disclosure is not limited thereto. In an example, the timing controller 140 may generate the output data Dout by additionally reflecting an optical measurement result, threshold voltage information of a driving transistor included in each of the pixels PX, and the like.

Figure 12:
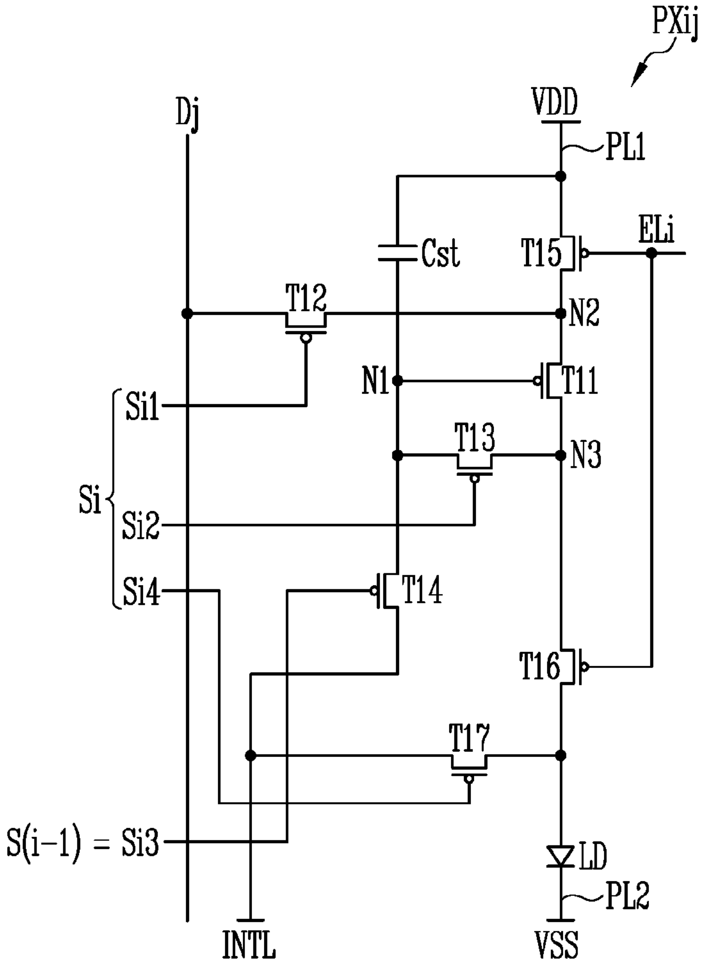
FIG. 12 is a diagram illustrating an embodiment of a pixel shown in FIG. 2.

FIG. 12 is a diagram illustrating an embodiment of the pixel shown in FIG. 2.

Referring to FIG. 12, a pixel PXij may include transistors T11, T12, T13, T14, T15, T16, and T17, a storage capacitor Cst, and a light emitting element LD.

Hereinafter, a circuit implemented with a P-type transistor is described as an example. However, those skilled in the art may design a circuit implemented with an N-type transistor by changing the polarity of a voltage applied to a gate terminal. Similarly, those skilled in the art may design a circuit implemented with a combination of the P-type transistor and the N-type transistor. The transistor may be configured in various forms including a Thin Film Transistor (TFT), a Field Effect Transistor (FET), a Bipolar Junction Transistor (BJT), and the like.

A gate electrode of an eleventh transistor T11 may be connected to a first node N1, a first electrode of the eleventh transistor T11 may be connected to a second node N2, and a second electrode of the eleventh transistor T11 may be connected to a third node N3. The eleventh transistor T11 may be referred to as a driving transistor.

A gate electrode of a twelfth transistor T12 may be connected to a scan line Si1, a first electrode of the twelfth transistor T12 may be connected to a data line Dj, and a second electrode of the twelfth transistor T12 may be connected to the second node N2. The twelfth transistor T12 may be referred to as a scan transistor.

A gate electrode of a thirteenth transistor T13 may be connected to a scan line Si2, a first electrode of the thirteenth transistor T13 may be connected to the first node N1, and a second electrode of the thirteenth transistor T13 may be connected to the third node N3. The thirteenth transistor T13 may be referred to as a diode connection transistor.

A gate electrode of a fourteenth transistor T14 may be connected to a scan line Si3, a first electrode of the fourteenth transistor T14 may be connected to the first node N1, and a second electrode of the fourteenth transistor T14 may be connected to an initialization line INTL. The fourteenth transistor T14 may be referred to as a gate initialization transistor.

A gate electrode of the fifteenth transistor T15 may be connected to an ith emission control line ELi, a first electrode of the fifteenth transistor T15 may be connected to a first power line PL1, and a second electrode of the fifteenth transistor T15 may be connected to the second node N2. The fifteenth transistor T15 may be referred to as an emission transistor. In another embodiment, the gate electrode of the fifteenth transistor T15 may be connected to an emission control line different from an emission control line connected to a gate electrode of a sixteenth transistor T16.

The gate electrode of the sixteenth transistor T16 may be connected to the ith emission control line ELi, a first electrode of the sixteenth transistor T16 may be connected to the third node N3, and a second electrode of the sixteenth transistor T16 may be connected to an anode of the light emitting element LD. The sixteenth transistor T16 may be referred to as an emission transistor.

A gate electrode of a seventeenth transistor T17 may be connected to a scan line Si4, a first electrode of the seventeenth transistor T17 may be connected to the initialization line INTL, and a second electrode of the seventeenth transistor T17 may be connected to the anode of the light emitting element LD. The seventeenth transistor T17 may be referred to as a light emitting element initialization transistor.

A first electrode of the storage capacitor Cst may be connected to the first power line PL1, and a second electrode of the storage capacitor Cst may be connected to the first node N1.

The anode of the light emitting element LD may be connected to the second electrode of the sixteenth transistor T16, and a cathode of the light emitting element LD may be connected to a second power line PL2. The light emitting element LD may be a light emitting diode. The light emitting element LD may be configured as an organic light emitting diode, an inorganic light emitting diode, a quantum dot/well light emitting diode, or the like. The light emitting element LD may emits line of any one color among a first color, a second color, and a third color. In addition, in this embodiment, only one light emitting element LD is provided in each pixel. However, in another embodiment, a plurality of light emitting elements may be provided in each pixel. The plurality of light emitting elements may be connected in series, parallel, series/parallel, or the like.

A voltage of a first power source VDD may be applied to the first power line PL1, a voltage of a second power source VSS may be applied to the second power line PL2, and a voltage of an initialization power source may be applied to the initialization line INTL. For example, the voltage of the first power source VDD may be higher than the voltage of the second power source VSS. For example, the voltage of the initialization power source may be equal to or higher than the voltage of the second power source VSS. For example, the voltage of the initialization power source may correspond to a data voltage having the smallest magnitude among magnitudes of data voltages which can be provided. In another example, the magnitude of the voltage of the initialization power source may be smaller than those of the data voltages which can be provided.

Figure 13:
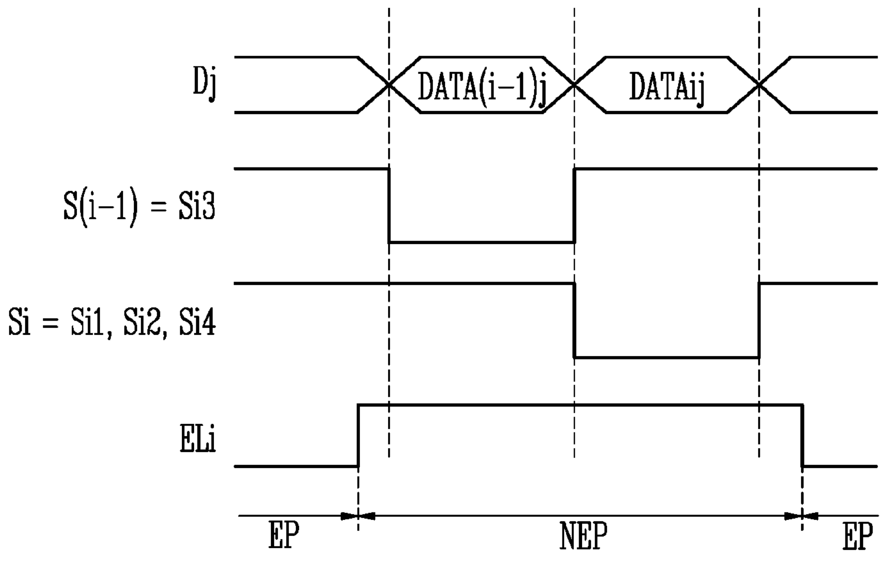
FIG. 13 is a diagram illustrating an exemplary driving method of the pixel shown in FIG. 12.

FIG. 13 is a diagram illustrating an exemplary driving method of the pixel shown in FIG. 12.

Hereinafter, for convenience of description, it is assumed that the scan lines Si1, Si2, and Si4 correspond to an ith scan line Si, and the scan line Si3 corresponds to an (i−1)th scan line S(i−1). However, in some embodiments, a connection relationship between the scan lines Si1, Si2, Si3, and Si4 may be diverse. For example, the scan line Si4 may be an (i−1)th scan line or an (i+1)th scan line.

First, an emission control signal having a turn-off level (logic high level) is applied to the ith emission control line ELi, a data signal DATA(i−1)j for an (i−1)th pixel is applied to the data line Dj, and a scan signal having a turn-on level (logic low level) is applied to the scan line Si3. High/low of a logic level may be changed according to whether a transistor is of a P-type or an N-type.

Since a scan signal having the turn-off level is applied to the scan lines Si1 and Si2, the twelfth transistor T12 is in a turn-off state, and the data signal DATA(i−1)j for the (i−1)th pixel is prevented from being input to the pixel PXij.

Since the fourteenth transistor T14 is in a turn-on state, the first node N1 is connected to the initialization line INTL, so that a voltage of the first node N1 is initialized. Since the emission control signal having the turn-off level is applied to the emission control line ELi, the transistors T15 and T16 are in the turn-off state, and unnecessary emission of the light emitting element LD in a process of applying the voltage of the initialization power source is prevented.

Next, a data signal DATAij for an ith pixel PXij is applied to the data line Dj, and the scan signal having the turn-on level is applied to the scan lines Si1 and Si2. Accordingly, the transistors T12, T11, and T13 are in a conduction state, and the data line Dj and the first node N1 are electrically connected to each other. Therefore, a compensation voltage obtained by subtracting a threshold voltage of the eleventh transistor T11 from the data signal DATAij is applied to the second electrode of the storage capacitor Cst (i.e., the first node N1), and the storage capacitor Cst maintains a voltage corresponding to the difference between the voltage of the first power source VDD and the compensation voltage. Such a period may be referred to as a threshold voltage compensation period or a data write period.

In addition, when the scan line Si4 is an ith scan line, the seventeenth transistor T17 is in the turn-on state. Hence, the anode of the light emitting element LD and the initialization line INTL are connected to each other, and the light emitting element LD is initialized to a charge amount corresponding to the voltage difference between the voltage of the initialization power source and the voltage of the second power source VSS.

After that, as the emission control signal having the turn-on level is applied to the ith emission control line ELi, the transistors T15 and T16 may be electrically connected to each other. Therefore, a driving current path is formed, through which the first power line PL1, the fifteenth transistor T15, the eleventh transistor T11, the sixteenth transistor T16, the light emitting element LD, and the second power line PL2 are connected to each other.

An amount of driving current flowing through the first electrode and the second electrode of the eleventh transistor T11 is adjusted according to the voltage maintained in the storage capacitor Cst. The light emitting element LD emits light with a luminance corresponding to the amount of driving current. The light emitting element LD emits light until before the emission control signal having the turn-off level is applied to the emission control line ELi.

When an emission control signal has the turn-on level, pixels receiving the corresponding emission control signal may be in a display state. Therefore, the period in which the emission control signal has the turn-on level may be referred to as an emission period EP (or emission allow period). In addition, when an emission control signal has the turn-off level, pixels receiving the corresponding emission control signal may be in a non-display state. Therefore, the period in which the emission control signal has the turn-off level may be referred to as a non-emission period NEP (or emission inhibit period).

The non-emission period NEP described in FIG. 13 is used to prevent the pixel PXij from emitting light with an unwanted luminance while passing through the initialization period and the data write period.

One or more non-emission periods NEP may be additionally provided while a data signal written to the pixel PXij is maintained (e.g., one frame period). This is for the purpose of reducing the emission period EP of the pixel PXij, thereby effectively expressing a low grayscale or gently blurring motion of an image.

In the display device and the method of driving the same in accordance with the present disclosure, a panel temperature can be decided corresponding to an ambient temperature supplied from the temperature sensor, and a temperature for each position of the display unit may be decided. Also, in accordance with the present disclosure, data is compensated corresponding to a temperature for each position of the display unit and a dimming level, so that an image with a uniform luminance can be displayed in the display unit.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a display unit including pixels connected to data lines and scan lines, the display unit being partitioned into a plurality of blocks;

at least one driver overlapping with the display unit in a plan view, wherein the at least one driver is configured to drive the display unit;

a temperature sensor configured to generate an ambient temperature value; and a timing controller configured to generate a panel temperature value corresponding to an actual temperature of the display unit by using the ambient temperature value, generate block temperature values corresponding to temperatures of the plurality of blocks, respectively, by using the panel temperature value, and generate pixel temperature values corresponding to temperatures of the pixels included in the plurality of blocks, respectively, by using the panel block temperature values, wherein the timing controller is supplied with input data, and generates output data by reflecting the pixel temperature values on the input data.

2. The display device of claim 1, wherein the drivers include:

a scan driver configured to supply a scan signal to the scan lines;

a data driver configured to supply a data signal to the data lines;

the timing controller; and an application processor configured to supply a dimming level and the input data to the timing controller.

3. A display device comprising:

a display unit including pixels connected to data lines and scan lines, the display unit being partitioned into a plurality of blocks;

at least one driver overlapping with the display unit in a plan view, wherein the at least one driver is configured to drive the display unit;

a temperature sensor configured to generate an ambient temperature value; and a timing controller configured to generate a panel temperature value corresponding to an actual temperature of the display unit by using the ambient temperature value, and generate pixel temperature values corresponding to temperatures of the pixels, respectively, by using the panel temperature value, wherein the timing controller is supplied with input data, and generates output data by reflecting the pixel temperature values on the input data, wherein the blocks include:

at least one local block including an area overlapping with the driver in the plan view, and the at least one local block includes a plurality of sub-blocks; and at least one global block including an area not overlapping with the driver in the plan view.

4. The display device of claim 3, wherein a total number of pixels included in the global block is greater than a total number of pixels included in each of the sub-blocks.

5. The display device of claim 3, further comprising a storage unit including a first lookup table in which the panel temperature value corresponding to the ambient temperature value is stored and a second lookup table in which a temperature value of each of the sub-blocks and the global block, which corresponds to the panel temperature value, is stored.

6. The display device of claim 5, wherein the timing controller includes a dimming unit configured to generate the output data by correcting the input data, corresponding to a dimming level input from an outside and the pixel temperature value.

7. The display device of claim 6, wherein the timing controller includes:

a block temperature calculator configured to extract the panel temperature value corresponding to the ambient temperature value from the first lookup table, and extract block temperature values corresponding to temperatures of the sub-blocks and the global block, respectively, from the second lookup table, corresponding to the panel temperature value; and a pixel temperature calculator configured to generate the pixel temperature values by calculating temperatures of the pixels included in the sub-blocks and the global block, respectively, corresponding to the block temperature values.

8. The display device of claim 7, wherein the pixel temperature calculator generates the pixel temperature values such that pixels located at a boundary portion of sub-blocks adjacent to each other among the sub-blocks have temperature difference within a predetermined range or a same temperature value.

9. The display device of claim 7, wherein the pixel temperature calculator generates the pixel temperature values such that pixels located at a boundary portion of at least one of the sub-blocks and the global block have temperature difference within a predetermined range or a same temperature value.

10. The display device of claim 6, wherein the dimming unit includes a dimming lookup table including offset values corresponding to grayscales of the input data, corresponding to a specific dimming level and a specific pixel temperature value.

11. The display device of claim 10, wherein the dimming lookup table is provided in plurality, and the plurality of dimming lookup tables correspond to at least two different dimming levels and at least two different pixel temperature values among the pixel temperature values.

12. The display device of claim 11, wherein the dimming unit further includes a dimming controller configured to select any one of the plurality of dimming lookup tables, corresponding to the specific dimming level and the specific pixel temperature value, and generate the output data by reflecting the offset values extracted from the selected dimming lookup table on the input data.

13. The display device of claim 12, wherein, when any dimming lookup table corresponding to the specific dimming level or the specific pixel temperature value is not included in the dimming unit, the dimming controller generates a dimming lookup table corresponding to the specific dimming level or the specific pixel temperature value by using interpolation, and generates the output data by using an offset value extracted from the generated dimming lookup table.

14. A method of driving a display device, the method comprising:

partitioning a display unit into a plurality of blocks, corresponding to positions of drivers overlapping with the display unit in a plan view;

generating an ambient temperature value by using a temperature sensor attached at a predetermined position of the display unit;

generating a panel temperature value corresponding to an actual temperature at the predetermined position of the display unit by using the ambient temperature value;

generating block temperature values corresponding to temperatures of the plurality of blocks, respectively, by using the panel temperature value;

generating pixel temperature values corresponding to temperatures of pixels included in the plurality of blocks by using the block temperature values; and generating output data by correcting input data, corresponding to the pixel temperature values and a dimming level.

15. The method of claim 14, wherein the blocks include:

at least one local block including an area overlapping with the driver in the plan view, and the at least one local block includes a plurality of sub-blocks; and at least one global block including an area not overlapping with the driver in the plan view.

16. The method of claim 15, wherein a total number of pixels included in the global block is greater than a total number of pixels included in each of the sub-blocks.

17. The method of claim 14, wherein the generating of the panel temperature value is extracting the panel temperature value from a first lookup table in which the panel temperature value corresponding to the ambient temperature value is stored, and wherein the generating of the block temperature values is extracting the block temperature values from a second lookup table in which temperature values of the blocks, which corresponds to the panel temperature value, are stored.

18. The method of claim 14, wherein, in the generating of the pixel temperature values, the pixel temperature values are generated such that pixels located at a boundary portion of blocks adjacent to each other among the blocks have temperature difference within a predetermined range or a same temperature value.

19. The method of claim 14, wherein the generating of the output data includes:

selecting at least one dimming lookup table corresponding to a specific pixel temperature value and a specific dimming level among a plurality of dimming lookup tables corresponding to a plurality of dimming levels and the pixel temperature values; and generating the output data by applying offset values included in the dimming lookup table to the input data.

20. The method of claim 19, further comprising generating a virtual dimming lookup table by interpolating at least two dimming lookup tables, corresponding to the specific pixel temperature value and the specific dimming level.

* * * * *